United States Patent [19]

Lazarus, III

[11] 4,290,531

[45] Sep. 22, 1981

[54] DEVICE FOR HOLDING COOKING POTS AND LIDS

[76] Inventor: Fred Lazarus, III, c/o Federated Department Stores, Inc., 7 W. Seventh St., Cincinnati, Ohio 45202

[21] Appl. No.: 85,227

[22] Filed: Oct. 15, 1979

[51] Int. Cl.³ .............................................. A47F 5/08
[52] U.S. Cl. ...................................... 211/71; 211/113
[58] Field of Search ...................... 211/71, 13, 41, 113, 211/119; 248/339, 318

[56] References Cited

U.S. PATENT DOCUMENTS

| | | | |
|---|---|---|---|
| 507,394 | 10/1893 | Trewaella | 248/339 |
| 2,608,305 | 8/1952 | Sager | 211/71 X |
| 3,515,285 | 6/1970 | Wilkes | 211/71 |
| 4,097,015 | 6/1978 | Frishman | 248/339 |

FOREIGN PATENT DOCUMENTS 2293894  7/1976  France .................... 211/71

Primary Examiner—Roy D. Frazier
Assistant Examiner—Robert W. Gibson, Jr.
Attorney, Agent, or Firm—Frost & Jacobs

[57] ABSTRACT

A holder for suspending the handles of pots from hooks secured to the underside of an elongated mounting member, each hook having a coacting vertically adjustable elongated member configured at its lower end to engage the handle of the pot lid so that each pot and its lid may be suspended from the holder with the lid seated on the pot.

10 Claims, 3 Drawing Figures

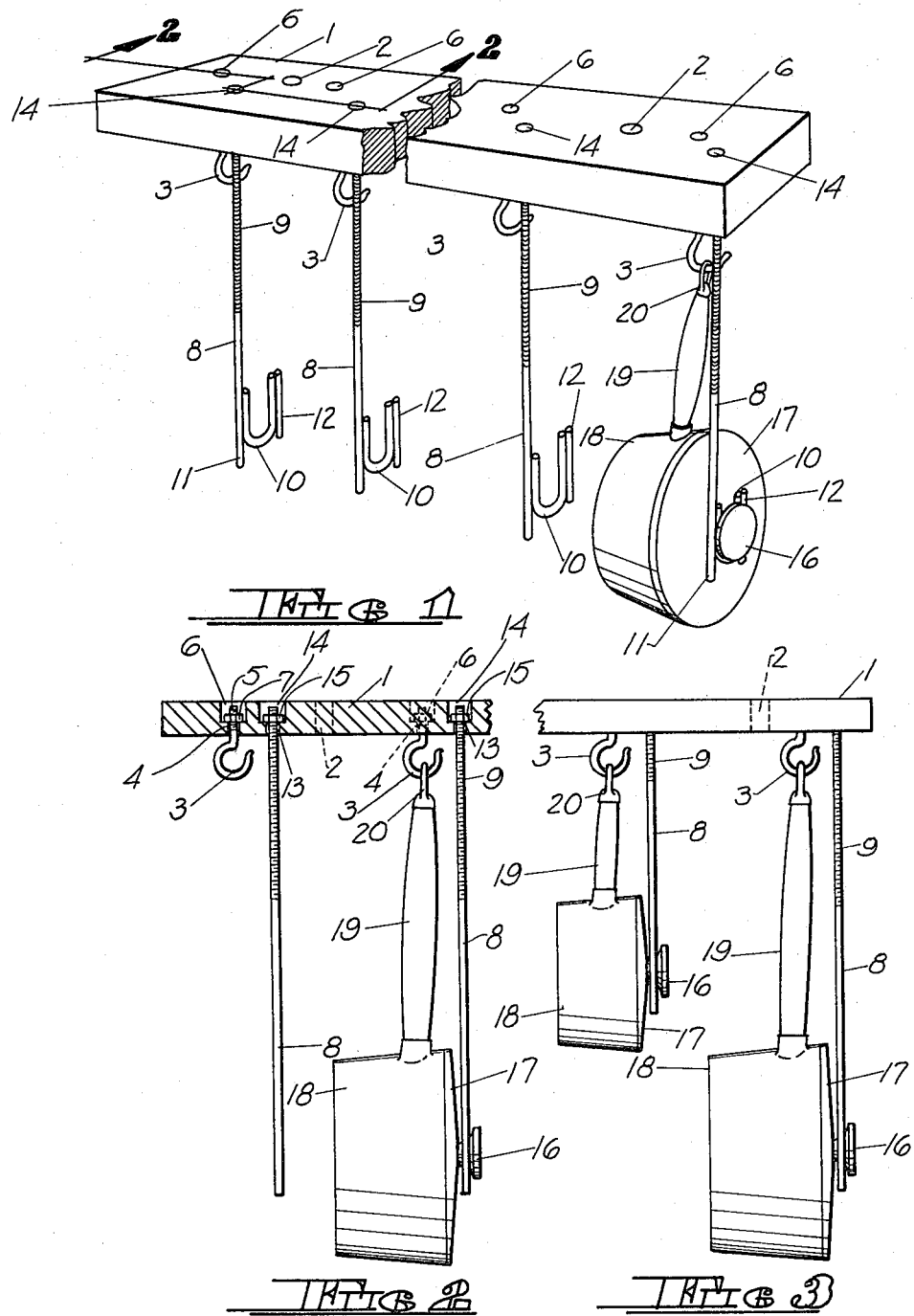

DEVICE FOR HOLDING COOKING POTS AND LIDS

BRIEF SUMMARY OF THE INVENTION

This invention relates to a device for holding cooking pots and their lids, and has to do more particularly with a holder for suspending the handles of cooking pots by means of hooks secured to the underside of a mounting member, each hook having a coacting vertically adjustable member which engages the knobbed handle of the pot lid so that each pot and its lid may be suspended from the holder with the lid seated on the pot.

BACKGROUND OF THE INVENTION

Various expedients have hitherto been employed to hang cooking vessels and other types of cooking utensils in the kitchen in locations where they may be readily reached, ranging from conventional hooks mounted on a wall or overhead support to more elaborate rack-like structures adapted to be suspended above a food preparation table. For this purpose, the handles of many utensils, such as cooking pans, pots and skillets, are provided at their distal ends with eyelets or rings by means of which the utensils may be suspended from a supporting hook. Many cooking utensils are provided with lids, but the lids required separate storage, normally being relegated to a shelf or drawer remote from the cooking vessels themselves.

While in many homes cooking pots and their lids are stored together in kitchen cabinets, many home-chefs prefer to display their cookware in the kitche, particularly if they are the owners of gourmet cookware which many persons regard as collectors items worthy of display. While conventional hooks and racks may be utilized for displaying the cookware, the lids must be stored separately.

In contrast to conventional hook and rack arrangements for storing and displaying cooking utensils, the present invention provides a device by means of which cooking pots and their lids may be stored and displayed with the lids seated on the pots.

SUMMARY OF THE INVENTION

In accordance with the present invention, a pot holding device is provided comprising an elongated mounting member, such as a strip of wood, to which a plurality of pot-suspending hooks are secured in spaced apart relation. The mounting member may be secured to a suitable overhead supporting surface, such as the kitchen ceiling, an overhead beam, or the undersurface of a soffit or kitchen cabinet, with the hooks projecting downwardly from the mounting member.

Mounted adjacent to each hook is a coacting vertically adjustable handle supporting member which preferably is formed of rod stock, the lid mounting members having means at their lowermost ends, such as a hook-like bail, adapted to engage about the handle on the lid, which is usually in the form of a knob secured to the center of the lid. The spacing between each pot supporting hook and its coacting lid mounting member will be such that when the pot is suspended by its handle from the hook, the lid will be seated on top of the pot in its normal position of use. With this arrangement each pot and its lid may be stored and displayed together.

Since most gourmet cooking pots can be obtained in matched sets of different sizes, the number of hooks and coacting lid mounting members may be varied as desired, as may the lengths of the pot holding members, which will vary depending upon the size of the pot and its mating lid.

BRIEF DESCRIPTION OF THE DRAWINGS

FIG. 1 is a perspective view illustrating a pot and lid holding device in accordance with a preferred embodiment of the invention.

FIG. 2 is a vertical sectional view taken along the irregular line 2—2 of FIG. 1, the view illustrating the manner in which the hooks and lid holding members are secured to the mounting member.

FIG. 3 is a vertical sectional view illustrating the manner in which the lengths of the lid holding members may be varied to accommodate pots of different sizes.

DETAILED DESCRIPTION

The device comprises a mounting member 1 which may be in the form of an elongated strip of wood which may be finished as desired. The mounting member is adapted to be secured in horizontal position to a supporting surface, such as a ceiling, beam, or the like. To this end, the mounting member may be provided with drilled holes 2 for receiving suitable mounting screws. It will be understood, of course, that any suitable attachment means may be utilized to secure the mounting member to its supporting surface. Hooks 3 are secured to the mounting member so as to project downwardly therefrom. The number of hooks will vary depending upon the number of pots to be stored, and they will lie in spaced apart relation to each other. The hooks may be equally spaced from each other, or the spacing may be varied in accordance with the sizes of the pots to be stored if, for example, the holder is specifically designed to accommodate a set of pots produced by a particular manufacturer. In the embodiment illustrated, the mounting member is provided with drilled holes 4 of a size to receive the threaded shanks 5 of the hooks, the holes 4 opening upwardly into enlarged counter bores 6 of a size to receive the nuts 7 which, when threaded on the shanks 5 of the hooks, securely fasten the hooks to the mounting member. This arrangement also provides for limited vertical adjustment of the hooks and hence the vertical position of a pot hung on the hook.

Each hook 3 is provided with a coacting lid holding member 8 in the form of an elongated rod the upper portion of which is threaded, as indicated at 9. The lowermost ends of the rods are provided with means for engaging the handles of the lids. In the embodiment illustrated, the handle engaging means comprises a laterally disposed U-shaped member 10 welded to the rod 9, the spacing being such that the distal end 11 of rod 9 projects downwardly beyond the U-shaped member 10. In similar fashion, a length of rod 12 is welded to the opposite leg of U-shaped member 10. The distal end of rod 9 and the opposing rod 12 act to stabilize the lid when its knob is received in the U-shaped member 10, and additionally provide a decorative appearance. It will be understood, of course, that the configuration of the knob engaging means at the lower end of rod 9 may be varied depending upon the size and configuration of the knob or handle it is to engage, the essential function of the handle engaging means being to hold the lid in seated position on the mating pot.

The upper ends of the rod 9 are secured to the mounting member 1 in essentially the same manner as the hooks 3, the mounting member being provided with drilled holes 13 having enlarged counter bores 14 for receiving the threaded upper ends of the rods, retaining nuts 15 being threaded on the upper ends of the rods in the manner illustrated. This arrangement provides for vertical adjustment of the lid holding members so that the lids may be accurately aligned with and seated on their respective pots.

It will be understood that the lengths of the rods 9 may be varied depending upon the sizes of the pots to be stored. If a given device is to be customized for a particular set of pots, the rods may be cut to the desired length in advance. Alternatively, the rods initially all may be of maximum length, in which event if different sizes of pots are to be stored, the user may cut off the upper ends of the rods to the desired length.

Since in the embodiment illustrated the U-shaped handle engaging members 10 project laterally from the rods 9, the drilled holes 13 and their coacting counter bores 14 are offset laterally with respect to the hook mounting holes 4 and their counter bores 6, thereby centering the lids with respect to the pots with which they are associated. Thus, as seen in FIG. 1, the knob 16 of lid 17 is centered with respect to pot 18 suspended from the overlying hook 3 by means of handle 19 having hook engaging loop or eyelet 20 at its outermost end. FIG. 3 illustrates how different size pots and their lids may be readily accommodated by varying the length of the rods 9.

While a preferred embodiment of the invention has been described, it will be evident that the essential feature of the invention lies in the provision of a hook-like member from which a pan may be suspended by its handle together with a coacting lid holding member which supports the lid and holds it in contact with the pot. It will be evident that the configuration of the lid holding members may be varied depending upon the size and/or configuration of the handles of the lids, and that the lid holding members could be fabricated from other materials, such as plastic. Similar considerations apply to the mounting member and the pot suspending hooks.

What is claimed is:

1. In combination in a holder for suspending a pot and its lid from an overhead support with the lid seated on the pot, a pot having a handle extending outwardly from one side thereof and a lid having a handle at its center, said holder comprising a first means for engaging and suspending said pot by its said handle, and a coacting second means for engaging and suspending said lid by its handle, said second means being positioned relative to said first means so as to hold the lid in seated position on said pot.

2. The holder claimed in claim 1 wherein said first means for suspending the pot by its handle comprises a hook, and wherein said coacting second means comprises an elongated member having means at its lower end engagable with the handle of said lid.

3. The holder claimed in claim 2 wherein the handle engaging means at the lowermost end of said elongated member is of upwardly opening essentially U-shaped configuration.

4. The holder claimed in claim 3 including a mounting member, said hook and the upper end of said elongated member being secured to said mounting member in spaced apart relation relative to each other.

5. The holder claimed in claim 4 including means for vertically adjusting said elongated member relative to said mounting member.

6. The holder claimed in claim 5 including means for adjustably mounting said hook relative to said mounting member.

7. A holder for suspending a pot and its lid from an overhead support with the lid seated on the pot, the pot having a handle extending outwardly from one side thereof and the lid having a handle at its center, said holder comprising a first means for engaging and suspending the pot by its handle, and a coacting second means for engaging and suspending the lid by its handle, said second means comprising an elongated rod having a threaded upper end, an adjustment nut in engagement with the threaded upper end of said rod, the lower end of said rod being configured to engage the handle of the lid, said rod being positioned relative to said first means so as to hold the lid in seated position on the pot.

8. The holder claimed in claim 7 wherein said threaded rod has an upwardly opening U-shaped configuration at its lower end engagable with the handle of the lid.

9. The holder claimed in claim 7 wherein said first means for suspending the pot by its handle comprises a hook, and wherein said coacting second means comprises a laterally disposed upwardly opening U-shaped member having one side thereof welded to said elongated member with the lowermost end portion of said elongated member projecting downwardly beyond said U-shaped member, and a rod-like member welded to the opposite side of said U-shaped member and projecting downwardly therefrom in alignment with the downwardly extending end of said elongated member, the downwardly projecting ends of said elongated member and said rod-like member acting to stabilize the lid.

10. The holder claimed in claim 9 wherein the handle engaging means at the lowermost end of the said elongated member comprises a laterally disposed upwardly opening U-shaped member having one side thereof welded to said elongated member with the lowermost end portion of said elongated member projecting downwardly beyond said U-shaped member, and a rod-like member welded to the opposite side of said U-shaped member and projecting downwardly therefrom in alignment with the downwardly extending end of said elongated member, the downwardly projecting ends of said elongated member and said rod-like member acting to stabilize the lid.

* * * * *